United States Patent
Chun et al.

(10) Patent No.: US 8,498,263 B2
(45) Date of Patent: Jul. 30, 2013

(54) METHOD FOR TRANSMITTING A CONTROL SIGNAL IN A RADIO COMMUNICATION SYSTEM

(75) Inventors: Jin Young Chun, Anyang-si (KR); Sung Ho Park, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 13/143,723

(22) PCT Filed: Nov. 24, 2009

(86) PCT No.: PCT/KR2009/006914
§ 371 (c)(1),
(2), (4) Date: Jul. 7, 2011

(87) PCT Pub. No.: WO2010/079890
PCT Pub. Date: Jul. 15, 2010

(65) Prior Publication Data
US 2011/0274081 A1    Nov. 10, 2011

Related U.S. Application Data

(60) Provisional application No. 61/143,398, filed on Jan. 8, 2009.

(30) Foreign Application Priority Data

Apr. 9, 2009 (KR) ........................ 10-2009-0030997

(51) Int. Cl.
*H04W 4/00* (2009.01)
(52) U.S. Cl.
USPC .............................................. 370/330
(58) Field of Classification Search
None
See application file for complete search history.

(56) References Cited

U.S. PATENT DOCUMENTS

| 2007/0258358 | A1 | 11/2007 | Cho et al. |
| 2008/0232449 | A1 | 9/2008 | Khan et al. |
| 2008/0273479 | A1 | 11/2008 | Kwak et al. |
| 2011/0086662 | A1* | 4/2011 | Fong et al. .............. 455/517 |
| 2011/0223923 | A1* | 9/2011 | Cho et al. ............... 455/448 |
| 2011/0261774 | A1* | 10/2011 | Lunttila et al. .......... 370/329 |

* cited by examiner

*Primary Examiner* — John Blanton
(74) *Attorney, Agent, or Firm* — McKenna Long & Aldridge, LLP

(57) ABSTRACT

According to the invention, the method for transmitting a control signal in a radio communication system comprises the steps of generating a control signal in accordance with the type of subframe for transmitting the control signal, wherein said subframe is a first type of subframe including a basic number of OFDM symbols, a second type of subframe including a larger number of OFDM symbols than the first type subframe, or a third type of subframe including a smaller number of OFDM symbols than the first type of subframe; and transmitting the control signal via a control channel having a structure determined in accordance with the type of the subframe.

8 Claims, 30 Drawing Sheets

METHOD FOR TRANSMITTING A CONTROL SIGNAL IN A RADIO COMMUNICATION SYSTEM

This application is a 35 U.S.C. §371 National Stage entry of International Application No. PCT/KR2009/006914, filed on Nov. 24, 2009, and claims priority to U.S. Provisional Application No. 61/143,398, filed Jan. 8, 2009 and Korean Application No. 10-2009-0030997, filed Apr. 9, 2009, each of which is hereby incorporated by reference in its entirety as if fully set forth herein.

TECHNICAL FIELD

The present invention relates to radio communication, and more particularly, to a method for transmitting an uplink control signal.

BACKGROUND ART

The IEEE (Institute of Electrical and Electronics Engineers) 802.16 standard provides a technology and protocol for supporting a broadband wireless access. The IEEE 802.16-2001 started standardizing from 1999 and was approved in 2001. This is based on a single carrier physical layer called 'WirelessMAN-sc'. Thereafter, the IEEE 802.16a standard was approved in 2003, in which a physical layer was added with 'WirelessMAN-OFDM' and 'WirelessMAN-OFDMA' in addition to 'WirelessMAN-SC'. After the IEEE 802.16a standardization was completed, revised IEEE 802.16-2004 standard was approved in 2004. In order to correct bugs and errors of the IEEE 802.16-2004 standard, IEEE 802.16-2004/Cor1 (hereinafter, IEEE 802.16e) completed a format called 'corrigendum' in 2005.

Today, standardization for IEEE 802.16m that is the new technology standard is progressed based on IEEE 802.16e. The IEEE 802.16m that is the newly developed technology standard may be designed to support the IEEE 802.16e that is designed in advance. That is, a technology (IEEE 802.16m) of the newly designed system may be configured to be operated while efficiently including the existing technology (IEEE 802.16e). This is referred to as backward compatibility.

Hereinafter, a downlink (DL) means transmission from a base station to a user equipment and an uplink (UL) means transmission from a user equipment to a base station. The IEEE 802.16e system uses a time division duplex (TDD) type that divides an uplink and a downlink on a time by time basis, while the IEEE 802.16m system will adopt a frequency division duplex (FDD) type that divides an uplink and a downlink on a frequency by frequency basis in addition to the TDD type. In addition, in designing a frame of the IEEE 802.16m system, an extension of a bandwidth, a reduction in a cyclic prefix (CP) size, a transmission of a subframe unit in which a frame is divided into a plurality of subframes, or the like, are considered in order to improve a transmission rate. In addition, a frame that is different in a structure according to a case of supporting backward compatibility and a case of not supporting backward compatibility may be used the IEEE 802.16m system.

As described above, a need exists for a method of adaptively configuring an uplink control channel in a frame that may be variously configured.

DISCLOSURE

Technical Problem

The present invention provides a method for adaptively transmitting an uplink control signal.

Technical Solution

In an aspect, a method for transmitting a control signal in a radio communication system includes generating a control signal in accordance with a type of subframe for transmitting the control signal, wherein the type of subframe is one of a first type of subframe including a basic number of OFDM symbols, a second type of subframe including a larger number of OFDM symbols than the first type of subframe, and a third type of subframe including a smaller number of OFDM symbols than the first type of subframe, transmitting the control signal through a control channel in a subframe determined in accordance with the type of the subframe.

In another aspect, a method for transmitting a control signal in a radio communication system includes mapping a control signal to a control channel, the control channel including a plurality of mini tiles, each mini tile including at least one OFDM symbol in time domain and at least one subcarrier in frequency domain, and transmitting the control signal, wherein the plurality of mini tiles are distributed in the time domain or the frequency domain within a subframe, the subframe including at least one larger number of OFDM symbol or at least one smaller number of OFDM symbol than a reference subframe, and wherein a null or a sequence of the control signal is repeatedly mapped to the subframe having larger number of OFDM symbol, and the sequence of the control signal or a pilot is punctured and mapped to the subframe having smaller number of OFDM symbol.

Advantageous Effects

By using frames having various structures, uplink control signals can adaptively be transmitted.

MODE FOR INVENTION

The following technologies may be used for various radio access systems, such as a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, or the like. The CDMA may be implemented by a radio technology such as universal terrestrial radio access (UTRA) or CDMA 2000. The TDMA may be implemented by radio technologies, such as global system for mobile communications (GSM)/general packet radio service (GPRS)/enhanced data rates for GSM evolution (EDGE). The OFDMA may be implemented by radio technologies, such as IEEE 802.11 (Wi-Fi), IEEE 802.16e (WiMAX), IEEE 802-20, Evolved-UTRA (E-UTRA), or the like. The UTRA is a portion of a Universal Mobile Telecommunications System (UMTS). The 3rd Generation Partnership Project (3GPP) long term evolution (LTE), which is a portion of Evolved UMTS (E-UMTS) using the E-UTRA, adopts the OFDMA at downlink and adopts the SC-FDMA for the uplink. The IEEE 802.16m is evolved from IEEE 802.16e.

Figure 1:
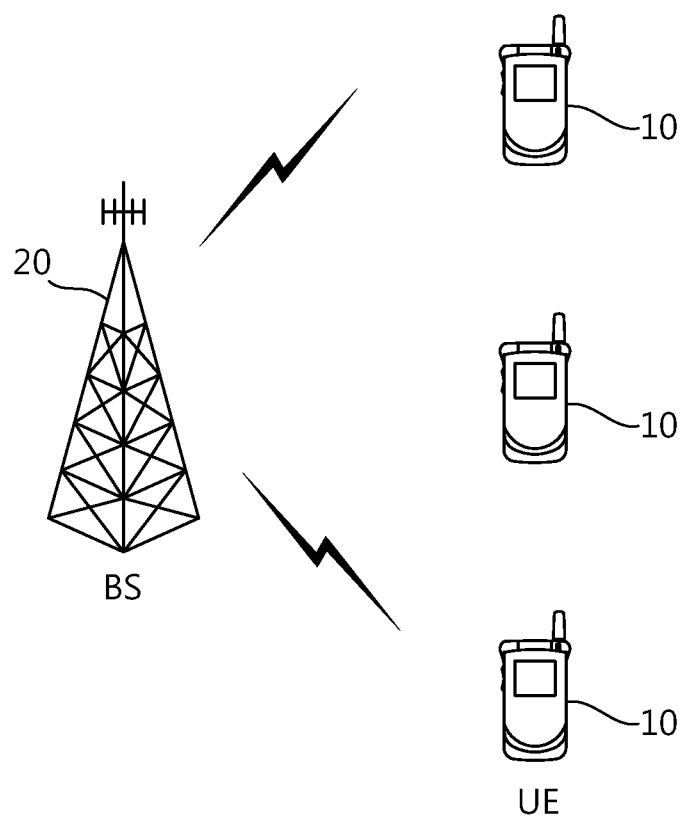
FIG. 1 is a block diagram showing a radio communication system.

FIG. 1 shows a block diagram of a radio communication system. A radio communication system is widely distributed so as to provide various communication services, such as audio, packet data, or the like.

Referring to FIG. 1, a radio communication system includes a user equipment (UE) 10 and a base station (BS) 20. The user equipment 10 may be fixed or have mobility and may be referred to as other terms, such as a mobile station (MS), a user terminal (UT), a subscriber station (SS), a wireless device, or the like. The base station 20 may be generally referred to as a fixed station that communicates with the user equipment 10 and may be referred to as other terms such as Node-B, a base transceiver system (BTS), an access point, or the like. At least one cell may be present in a single base station 20.

Hereinafter, downlink (DL) means communication from the base station 20 to the user equipment 10 and uplink (UL) means communication from the user equipment 10 to the base station 20. In DL, a transmitter may be a part of the base station 20 and a receiver may be a part of the user equipment 10. In UL, the transmitter may be a part of the user equipment 10 and the receiver may be a part of the base station 20.

Figure 2:
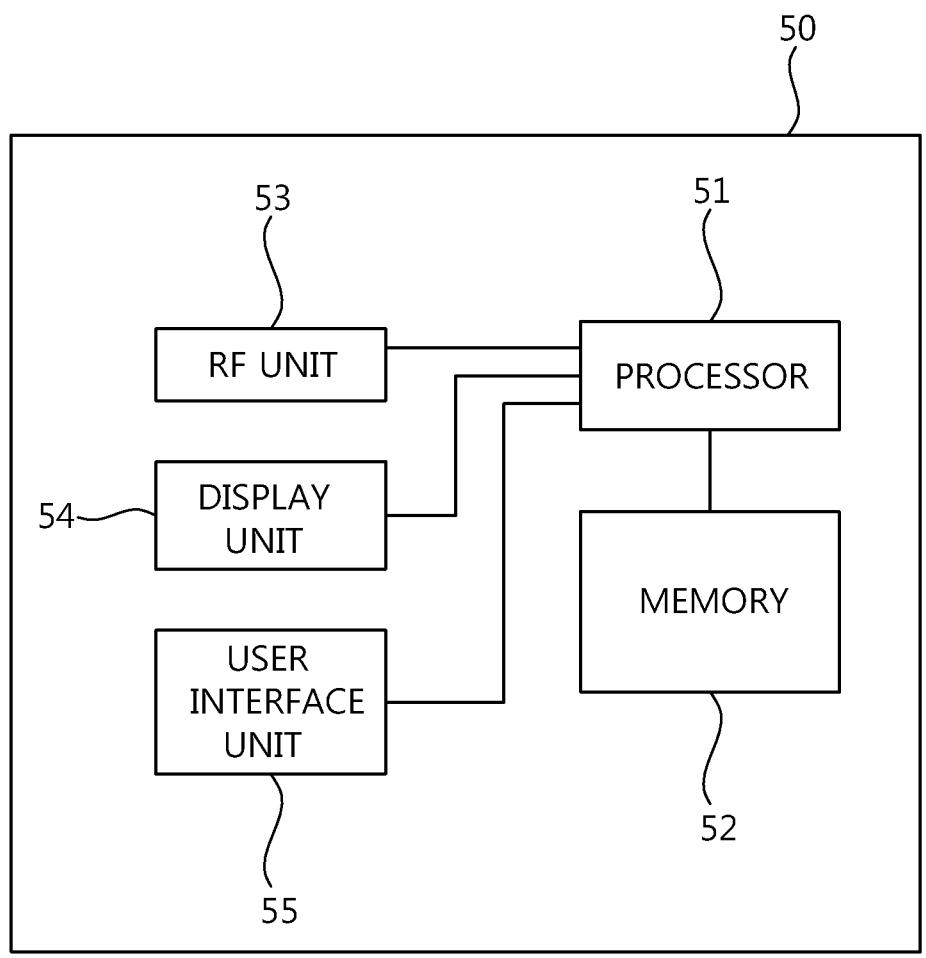
FIG. 2 is a block diagram showing components of a user equipment.

FIG. 2 shows a block diagram of components of a user equipment.

Referring to FIG. 2, a user equipment 50 includes a processor 51, a memory 52, an RF unit 53, a display unit 54, and a user interface unit 55. The processor 51 implements layers of a radio interface protocol to provide a control plane and a user plane. The functions of each layer may be implemented through the processor 51. The processor 51 processes data and/or control signals that are transmitted and received.

The memory 52 is connected with the processor 51 to store a user equipment driving system, applications, and general files. The display unit 54 displays various pieces of information of the user equipment and may use well known devices, such as a liquid crystal display (LCD), organic light emitting diodes (OLED), or the like. The user interface unit 55 may be configured by a combination of well known user interfaces such as a keypad, a touch screen, or the like. The RF unit 53 is connected with the processor and transmits and/or receives radio signals.

The layers of a radio interface protocol between the user equipment and the network may be divided into a first layer (L1), a second layer (L2), and a third layer (L3), based on three lower layers of an open system interconnection (OSI) model that are well known in a communication system. Among others, a physical layer belonging to the first layer provides information transfer services using a physical channel and a radio resource control (RRC) layer located at the third layer serves to control radio resources between the user equipment and the network. To this end, the RRC layer exchanges RRC messages between the user equipment and the network.

Figure 3:
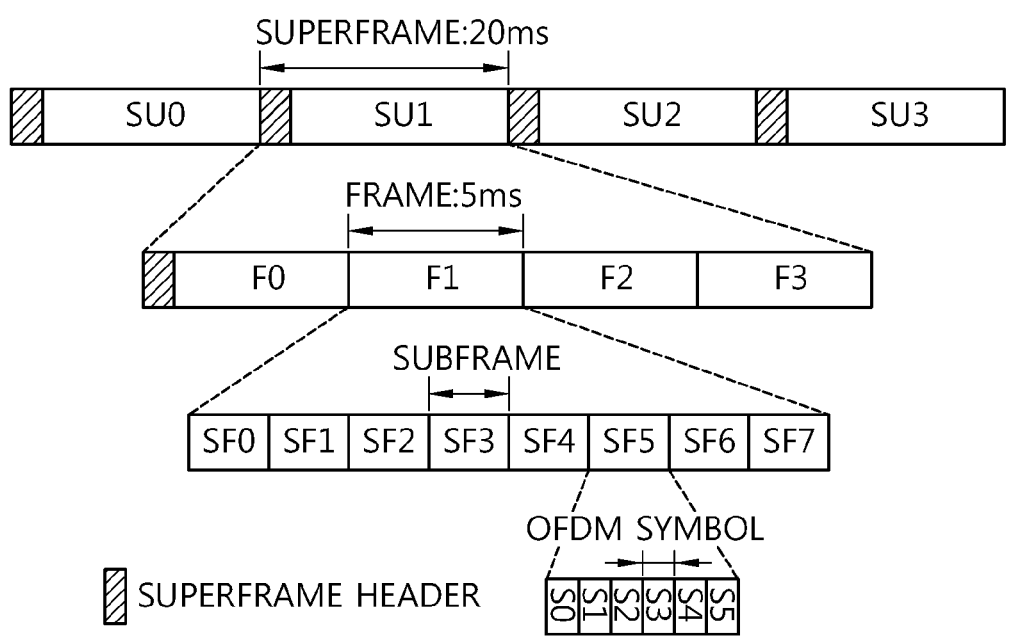
FIG. 3 is a diagram showing an example of a frame structure.

FIG. 3 shows an example of a frame structure.

Referring to FIG. 3, a superframe (SU) includes a superframe header and four frames (F0, F1, F2, and F3). The case in which a size of each superframe is 20 ms and a size of each frame is 5 ms is illustrated, but the exemplary embodiment of the present invention is not limited thereto. The superframe header may first be arranged in the superframe and is allocated with a common control channel. The common control channel is a channel used to transmit information on frames configuring the superframe or system information, for example, control information that may be commonly used by all the user equipments within cells.

A single frame includes a plurality of subframes (SF0, SF1, SF2, SF3, SF4, SF5, SF6, and SF7). Each subframe may be used for the uplink transmission or the downlink transmission. The subframe may include 5, 6, 7, or 8 OFDM symbols, but is only an example. The number of OFDM symbols included in the subframe is not limited. A time division duplexing (TDD) or a frequency division duplexing (FDD) may be applied to the frame. In the TDD, each subframe is used to perform the uplink transmission or the downlink transmission at different times at the same frequency. That is, the subframes within the frame according to the TDD are divided into an uplink subframe and a downlink subframe in time domain. In the FDD, each subframe is used to perform the uplink transmission or the downlink transmission at different frequencies but at the same time. That is, the subframes within the frame according to the FDD are divided into the uplink subframe and the downlink subframe in a frequency domain. The uplink transmission and the downlink transmission may occupy different frequency bands and may be made at the same time.

The uplink subframe may include a fast feedback channel, a bandwidth request channel, a hybrid automatic repeat request (HARQ) feedback channel, or the like. The fast feedback channel is a channel to perform the faster uplink transmission than a general uplink data. The bandwidth request channel is a channel requesting radio resources used to transmit the uplink data or the control signal. The HARQ feedback channel is a channel to transmit an acknowledgement (ACK)/non-acknowledgement signal as a response to data transmission. The fast feedback channel, the bandwidth request channel, and the HARQ feedback channel may be located at any place of the uplink subframe or the frame.

The subframe includes at least one frequency partition. The frequency partition may include at least one physical resource unit (PRU). The frequency partition may include a localized PRU and/or a distributed PRU. The frequency partition may be used for fractional frequency reuse (FFR) or other objects such as multicast and broadcast services (MBSs).

The PRU is defined as a basic physical unit for resource allocation including a plurality of consecutive OFDM symbols and a plurality of consecutive subcarriers. The number of OFDM symbols included in the PRU may be the same as the number of OFDM symbols included in a single subframe. For example, when the single subframe is configured of 6 OFDM symbols, the PRU may be defined as 18 subcarriers and 6 OFDM symbols. A logical resource unit (LRU) is a basic logical unit for distributed resource allocation and localized resource allocation. The LRU is defined as the plurality of OFDM symbols and the plurality of subcarriers and includes pilots used in the PRU. Therefore, the appropriate number of subcarriers in a single LRU depends on the number of allocated pilots.

The logical distributed resource unit (DRU) may be used so as to obtain a frequency diversity gain. The DRU includes a group of the subcarriers distributed in a single frequency partition. The size of the DRU is the same as the size of the PRU. A minimum unit forming the DRU is a single subcarrier.

The logical contiguous resource unit (CRU) may be used so as to obtain a frequency selective scheduling gain. The CRU includes a group of a localized subcarriers. The size of the CRU is the same as the size of the PRU.

The configuration of the uplink control channel will now be described. The uplink control channel includes a fast feedback channel, a bandwidth request channel, a HARQ feedback channel, or the like. The subframe includes at least one allocation unit. The allocation unit may correspond to the DRU. The allocation unit includes a plurality of tiles which include a plurality of mini tiles. The mini tile means a minimum unit of the radio resource allocation so as to transmit the control signals having a relatively small size. The size of the mini tile may be variously determined according to a type of control signal, a type of a subframe, or the like.

Figure 4:
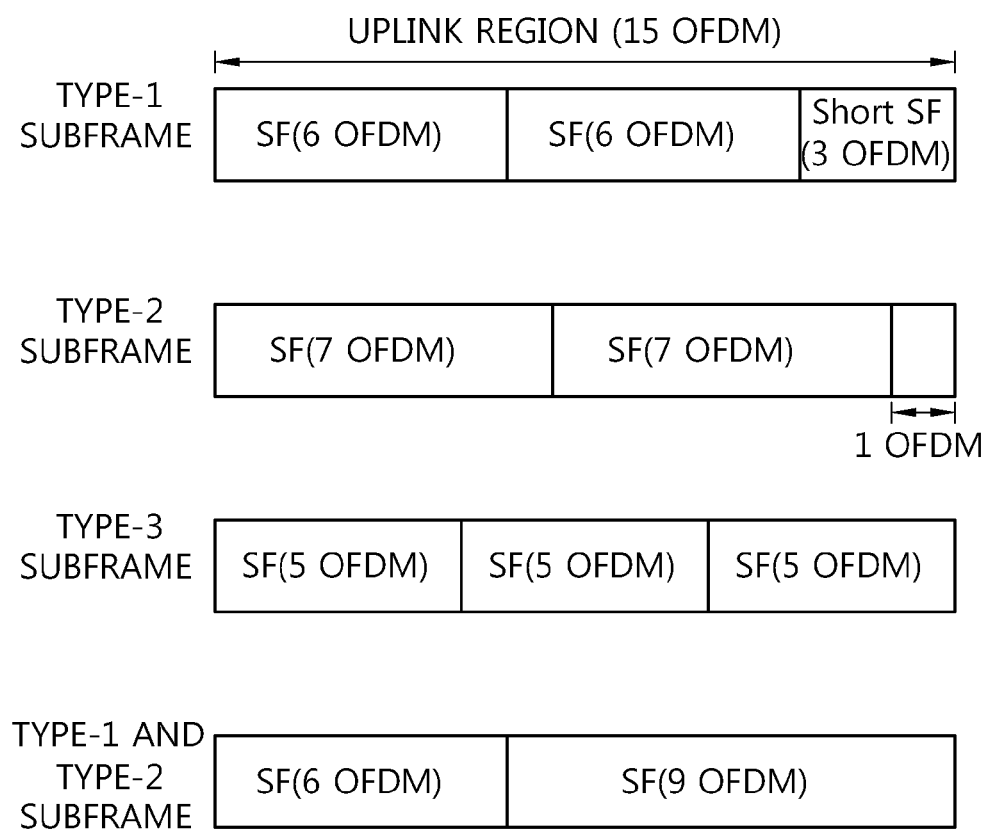
FIG. 4 shows a subframe type according to an exemplary embodiment of the present invention.

FIG. 4 shows a subframe type according to an exemplary embodiment of the present invention.

Referring to FIG. 4, the type of subframe may be sorted into type-1 subframe including the basic number of OFDM symbols, type-2 subframe including a larger number of OFDM symbols than the type-1 subframe, and type-3 subframe including a smaller number of OFDM symbols than the type-1 subframe, according to the number of symbols included therein. The type-1 subframe is a reference of another type of subframe and may be referred as a reference subframe or a general subframe. The number of OFDM symbols included in the type-1 subframe may correspond to the number of OFDM symbols included in the DRU.

In this case, it is assumed that the type-1 subframe includes 6 OFDM symbols. It is assumed that the type-2 subframe includes 7 or 9 OFDM symbols and the type-3 subframe includes 5 OFDM symbols. The number of OFDM symbols included in each type of subframe is only an example and therefore, is not limited.

When an uplink region (UL region) transmitting the uplink data and/or the uplink control signal is a multiple of the number of OFDM symbols included in the type-1 subframe, the uplink region may be configured of only the type-1 subframe. However, when the uplink region is not a multiple of the number of OFDM symbols included in the type-1 subframe, the uplink region may not be configured of only the type-1 subframe but may be configured using the type-2 subframe or the type-3 subframe.

For example, it is assumed that the uplink region includes 15 OFDM symbols. The uplink region may be configured of a short subframe including two type-1 subframes and 3 OFDM symbols. The short subframe means the subframe including a smaller number of OFDM symbols than the type-1 subframe and may include the OFDM symbols corresponding to ½ or ⅓ of the number of OFDM symbols included in the type-1 subframe. Alternatively, the uplink region may be configured of two type-2 subframes and a single OFDM symbol. Alternatively, the uplink region may be configured of three type-3 subframes. Alternatively, the uplink region may be configured of the type-1 subframe including 6 OFDM symbols and the type-2 subframe including 9 OFDM symbols. That is, the uplink regions may be configured of one type of subframe or multiple types of subframes. The number of OFDM symbols configuring the uplink region, the type of subframe, and the number of OFDM symbols included in the subframe are not limited.

The configuration of the tile configuring the subframe and the configuration of the mini tile configuring the tile may be varied according to the type of subframe (type-1, type-2, and type-3). The user equipment generates an appropriate type of uplink control signal according to the uplink region or the type of subframe at the time of transmitting the uplink control signal.

Figure 5:
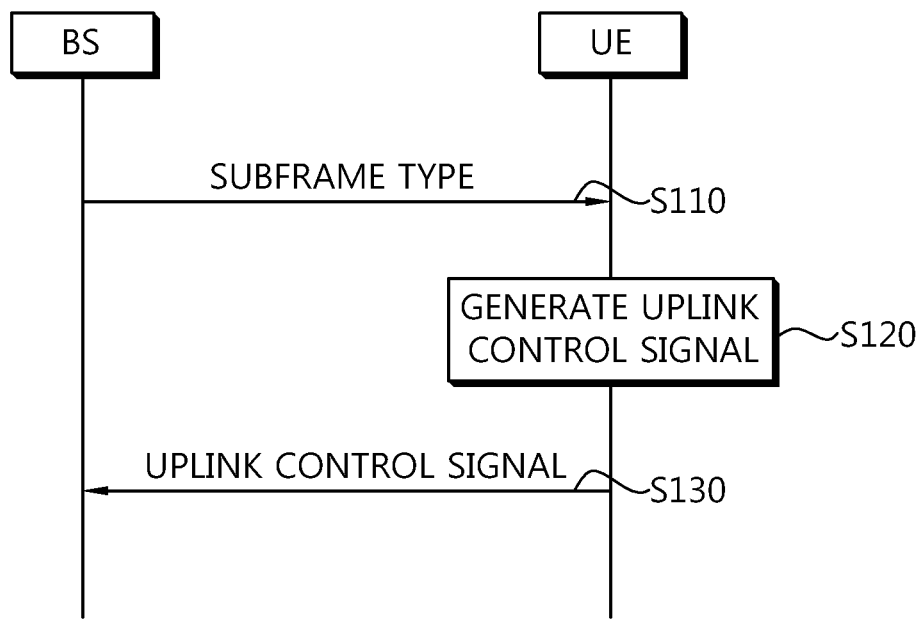
FIG. 5 is a diagram showing a method for transmitting an uplink control signal according to an exemplary embodiment of the present invention.

FIG. 5 shows a method for transmitting an uplink control signal according to an exemplary embodiment of the present invention.

Referring to FIG. 5, a base station transmit information on the type of subframe to a user equipment (S110). The information on the type of subframe may be transmitted through a broadcast channel. The information on the type of subframe may be transmitted while being included in the system information including essential information for communication. The information on the type of subframe may be periodically transmitted. The information on the change in the type of subframe may be transmitted in a period or by event occurrence. Alternatively, the information on the type of subframe may be transmitted to the user equipment requesting a bandwidth for uplink transmission in a unicast or multicast manner.

The user equipment generates the uplink control signal based on the information on the type of subframe (S120). An example of the uplink control signal may include a channel quality indicator (CQI), a bandwidth request signal, an ACK/NACK signal, a precoding matrix indicator (PMI), rank information (RI), or the like. The uplink control signal is mapped to mini tiles included in the tile in a subframe having a structure defined according to the type of subframe. A method for mapping the control signal to the tile and the mini tile according to the type of subframe will be described below.

The user equipment transmits the generated uplink control signal through the uplink control channel (S130).

<Uplink Control Channel Based on 6 OFDM Symbols>

Figure 6:
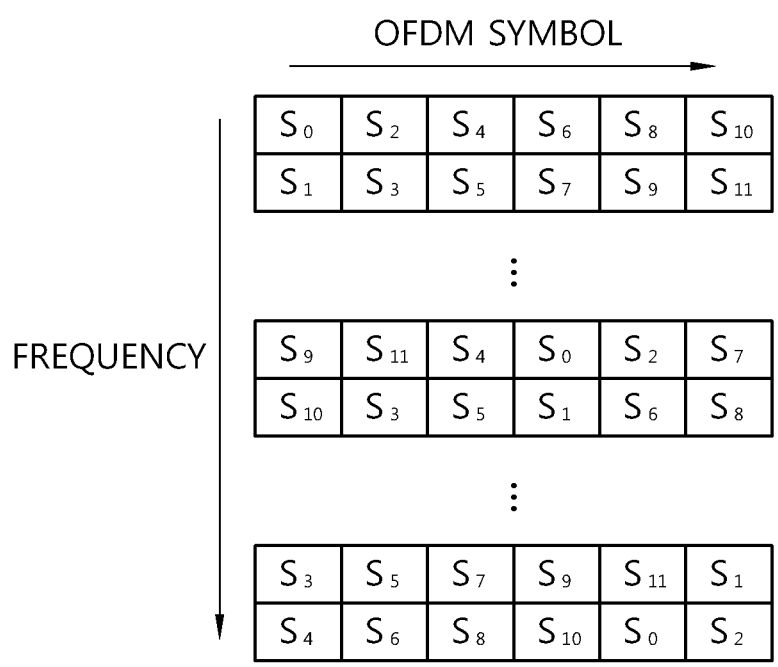
FIG. 6 is a diagram showing an example of the uplink control channel.

FIG. 6 shows an example of the uplink control channel. The example is the uplink control channel based on the type-1 subframe including 6 OFDM symbols.

Referring to FIG. 6, an allocation unit at the type-1 subframe includes 3 tiles. A tile includes 6 consecutive subcarriers and 6 consecutive OFDM symbols (hereinafter, represented as the number of subcarriers×the number of OFDM symbols tile=6×6 tile). When supporting 4×3 tiles having the tile structure of the conventional system, the allocation unit may include six 4×6 tiles. The single allocation unit may be allocated with at least one uplink control channel. For example, three 6×6 tiles or three 4×6 tiles may be allocated to the bandwidth request channel. Three 2×6 mini tiles may be allocated to the fast feedback channel. Three 2×2 mini tiles may be allocated to the HARQ feedback channel.

In this case, an example of allocating three 2×6 mini tiles to three uplink control channels among 6×6 tiles are shown. Three tiles may be distributed in the frequency domain and three mini tiles allocated to the uplink control channel may be selected from different tiles. That is, three mini tiles allocated to the uplink control channel may be distributed in the frequency domain. Sequences $S_0, \ldots S_1$ of the uplink control signal are mapped to three mini tiles. Each sequence of the uplink control signal may be mapped to each mini tile in different order. Since each mini tile does not include pilots, the uplink control signal may be detected in a non-coherent detection manner.

Figure 7:
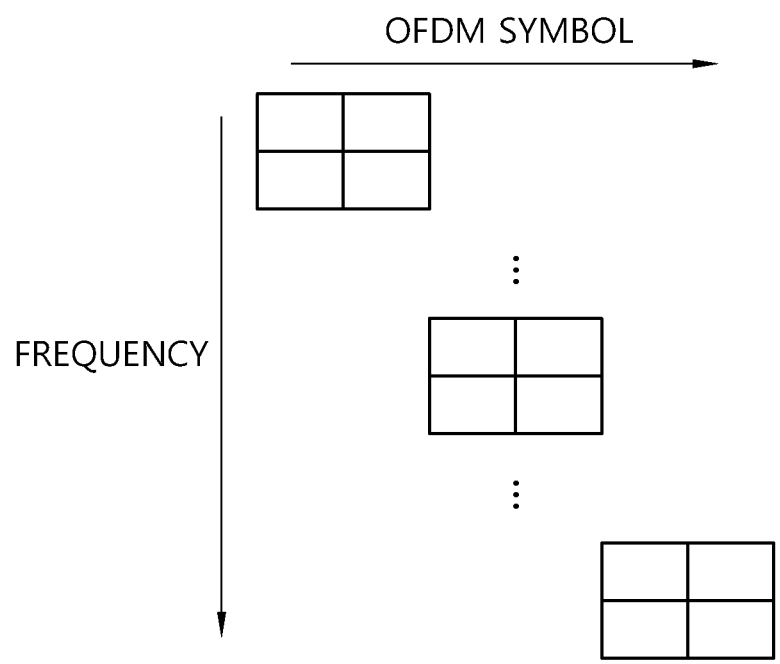
FIG. 7 is a diagram showing another example of an uplink control channel.

FIG. 7 shows another example of the uplink control channel. The example is the uplink control channel based on the type-1 subframe including 6 OFDM symbols.

Referring to FIG. 7, among 6×6 tiles, three 2×2 mini tiles may be allocated to the uplink control channel. Three mini tiles may be distributed in the frequency domain and/or the time domain. The sequence of the uplink control signal is mapped to each mini tile or a single symbol may be mapped thereto. Since the pilots are not included in each mini tile, the uplink control signal may be detected in the non-coherent detection manner.

Figure 8:
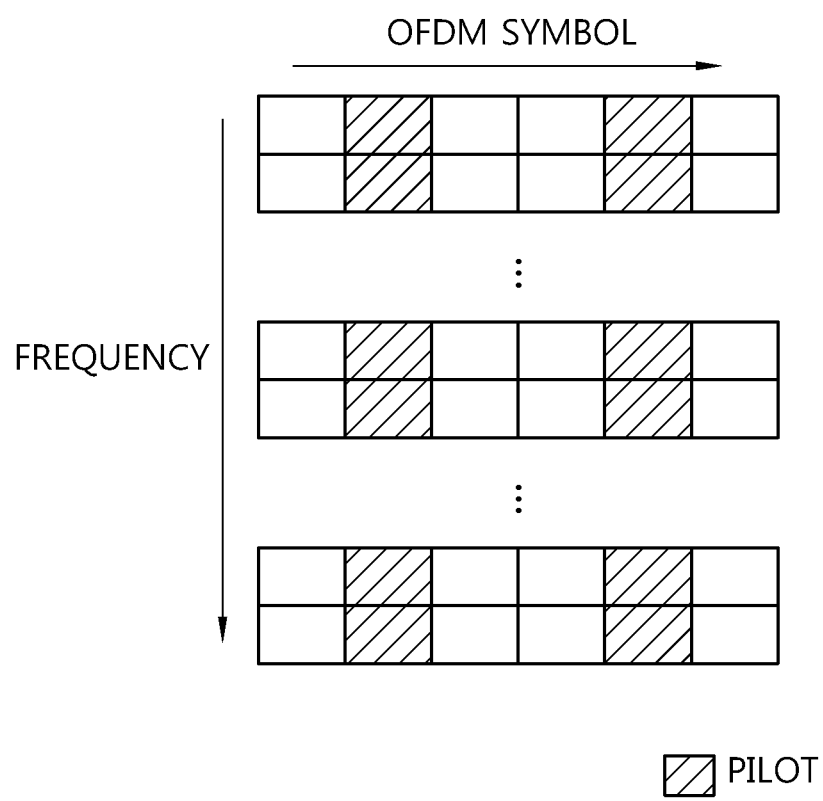
FIG. 8 is a diagram showing another example of the uplink control channel.

FIG. 8 shows another example of the uplink control channel. The example is the uplink control channel based on the type-1 subframe including 6 OFDM symbols.

As compared with the embodiment shown in FIG. 6, the embodiment shown in FIG. 8 shows another example of allocating the pilots for coherent detection. The pilots are allocated to a second OFDM symbol and a fifth OFDM symbol. That is, four pilots are allocated to each 2×6 mini tiles. The uplink control signal is mapped to the OFDM symbol, other than the OFDM symbols to which the pilots are allocated. The uplink control signal may be detected in the coherent detection manner.

Figure 9:
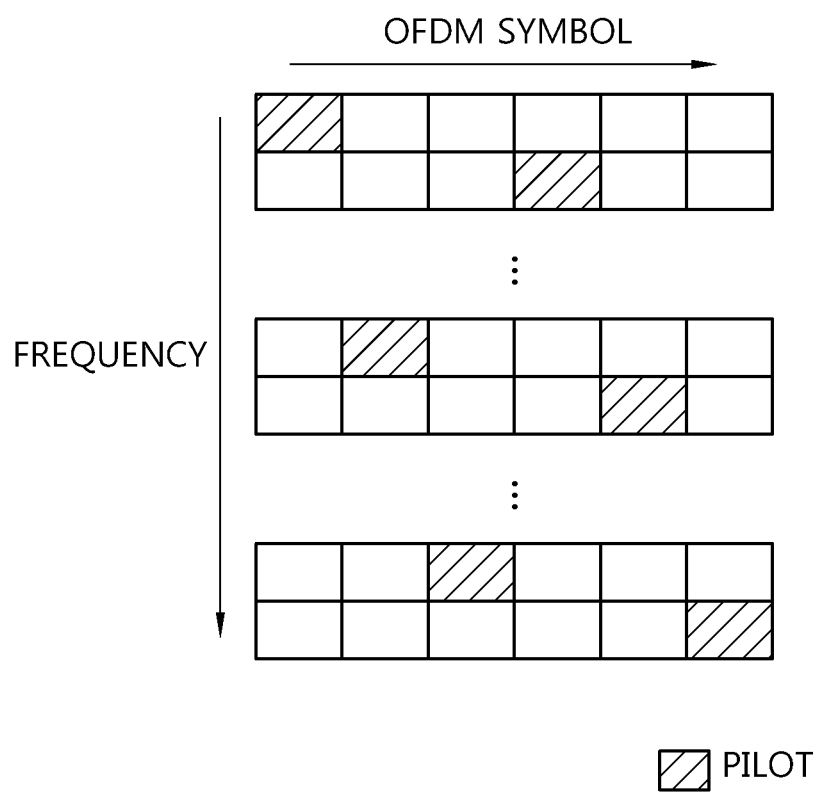
FIG. 9 is a diagram showing another example of an uplink control channel.

FIG. 9 shows another example of the uplink control channel. The example is the uplink control channel based on the type-1 subframe including 6 OFDM symbols.

As compared with the embodiment shown in FIG. 6, FIG. 9 shows an example of allocating the pilots for coherent detection. The pilots are allocated to different OFDM symbols for each 2×6 mini tiles and one pilot is allocated to one subcarrier in the frequency domain. That is, two pilots are allocated to each 2×6 mini tiles. As compared with FIG. 8, the number of pilots is reduced, while the pilots are uniformly distributed in the time domain and the frequency domain.

Figure 10:
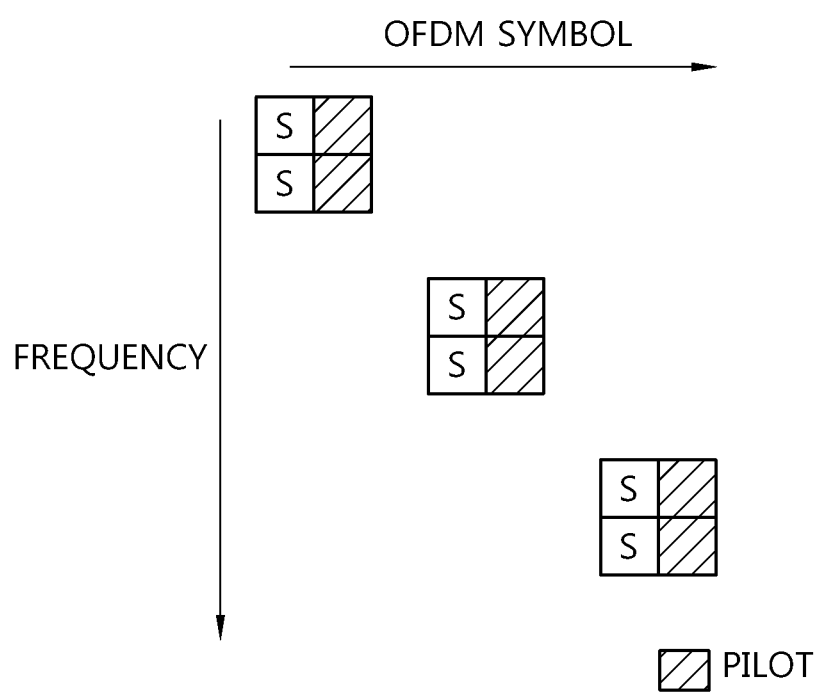
FIG. 10 is a diagram showing another example of an uplink control channel.

FIG. 10 shows another example of the uplink control channel. The example is the uplink control channel based on the type-1 subframe including 6 OFDM symbols.

Referring to FIG. 10, among 6×6 tiles, three 2×2 mini tiles may be allocated to the uplink control channel and the pilots are allocated to each mini tile. The case in which each mini tile is allocated to one OFDM symbol of each mini tile is shown, but the arrangement of the pilots is not limited. Three mini tiles may be distributed in the frequency domain and/or the time domain. In this case, the case in which one symbol (S) may be mapped to each mini tile is shown, but the sequence of the uplink control signal may be mapped to each mini tile. The uplink control signal may be detected in the coherent detection manner using the pilots.

<Uplink Control Channel Based on 5 OFDM Symbols>

When the uplink region is not a multiple of the number of OFDM symbols included in the type-1 subframe, the uplink region may not be configured of only the type-1 subframe but may be configured using the type-2 subframe or the type-3 subframe. First, a method of configuring the uplink control channel using the type-3 subframe including 5 OFDM symbols will be described. The method of mapping the uplink control signal to the type-3 subframe is described, comparing the case in which the uplink control signal is mapped to the type-1 subframe.

Figure 11:
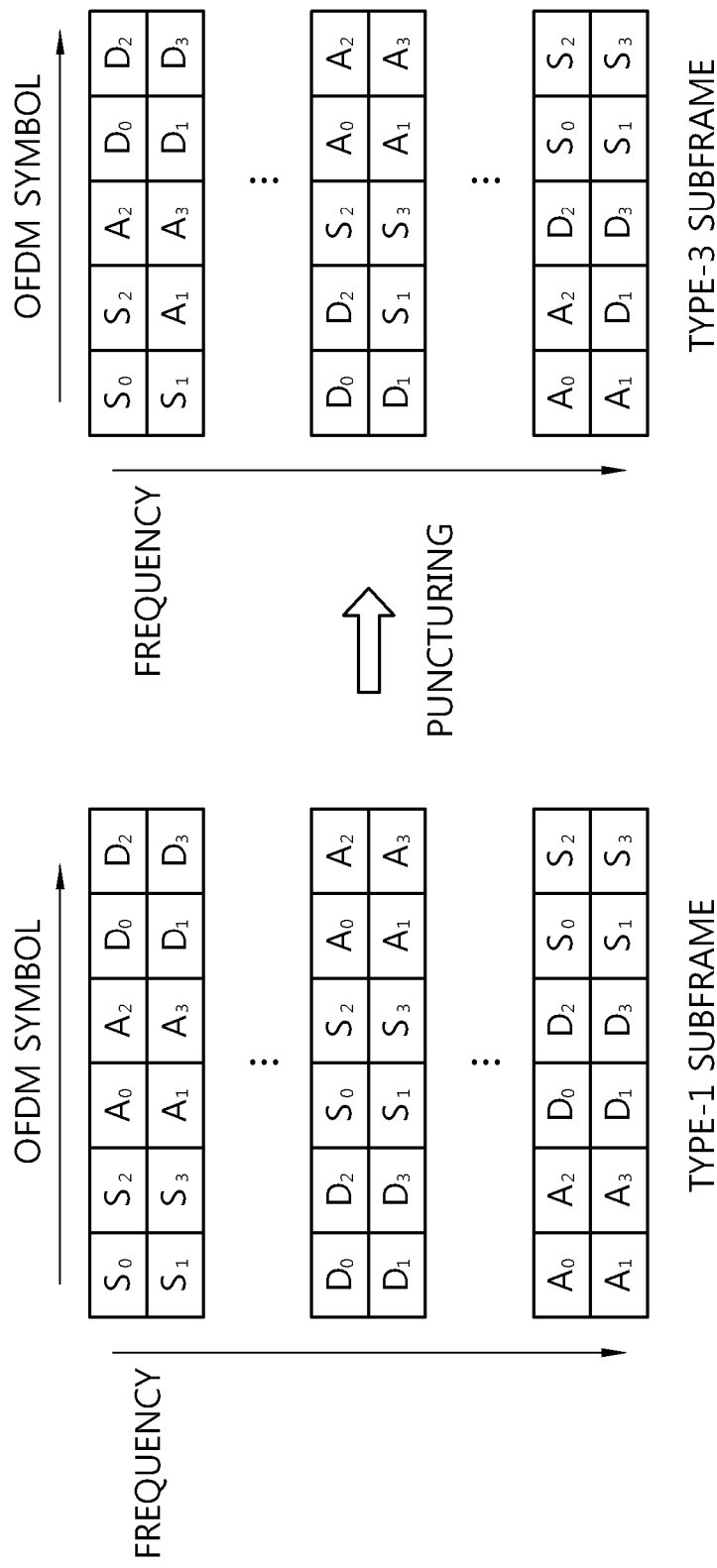
FIG. 11 is a diagram showing an uplink control channel according to an exemplary embodiment of the present invention.

FIG. 11 shows an uplink control channel according to one exemplary embodiment of the present invention. The example is the uplink control channel based on the type-3 subframe including 5 OFDM symbols.

Referring to FIG. 11, since the type-3 subframe includes 5 OFDM symbols, the tile has a 6×5 structure. Since the type-3 subframe has the number of OFDM symbols by one smaller than the number of OFDM symbols, compared with the type-1 subframe, the sequence of the uplink control signal is mapped to the type-3 subframe by puncturing some parts.

For example, it is assumed that three uplink control signals S ($S_0$, $S_1$, $S_2$, $S_3$), A ($A_0$, $A_1$, $A_2$, $A_3$), and D ($D_0$, $D_1$, $D_2$, $D_3$) in the type-1 subframe are each distributed and mapped to three 2×2 mini tiles. In the type-3 subframe, 2 bits of the sequence of the uplink control signal corresponding to one OFDM symbol is punctured and mapped in the mini tile group configured of adjacent 2×2 mini tiles of each control signal. In the first mini tile group of the type-1 subframe, $S_3$ and $A_0$ are punctured, in the second mini tile group, $D_3$ and $S_0$ are punctured, and in the third mini tile group, $A_3$ and $D_0$ are punctured. The position of the bit punctured in the sequence of the control signal is not limited and the number of punctured bits may be changed according to the structure of allocated mini tile. The same number of bits may be punctured for each sequence of each control signal, but may be punctured for each control signal according to the importance of the control signal or the sequence length. For example, when the control signal using the same length of sequence forms the mini tile group, the same number of bits may be punctured and when the control signal using the sequence having a longer length than other control signals forms the mini tile group, the number of bits punctured for each control signal may be changed.

Meanwhile, in the type-3 subframe, a higher coding rate than a coding rate applied in the type-1 subframe may be applied. The coding rate appropriate for a 5 OFDM symbol structure is separately prepared for the uplink control signal.

Figure 12:
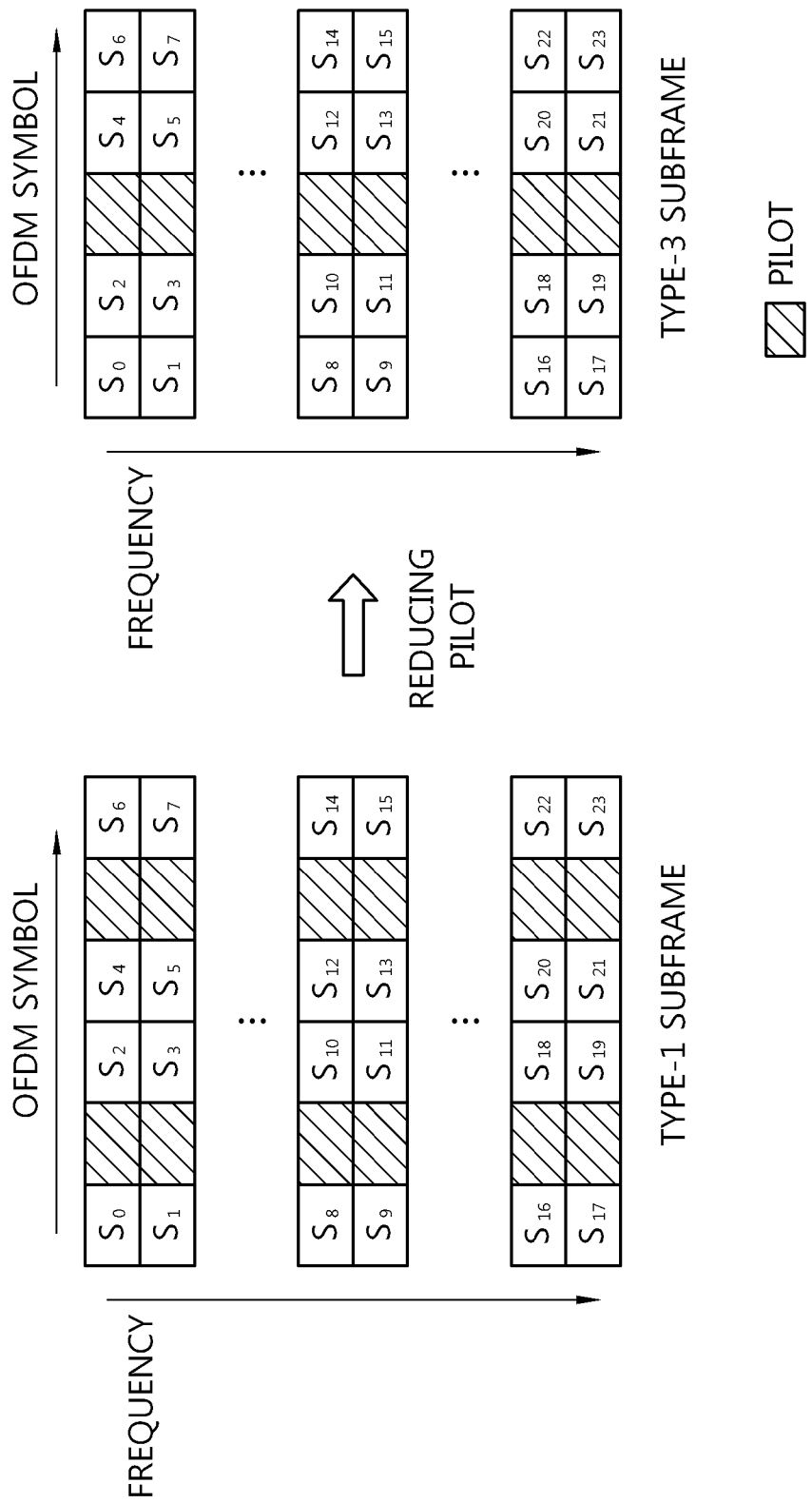
FIG. 12 is a diagram showing an uplink control channel according to another exemplary embodiment of the present invention.

FIG. 12 shows an uplink control channel according to another exemplary embodiment of the present invention. The example is the uplink control channel based on the type-3 subframe including 5 OFDM symbols.

Referring to FIG. 12, when the pilots are included in the subframe, the number of pilots is reduced in the type-1 subframe and the sequence of the uplink control signal mapped to the type-1 subframe may be mapped to the type-3 subframe.

For example, it is assumed that in the type-1 subframe, the uplink control signal S ($S_0$, $S_1$, $S_2$, $S_3$, $S_4$, $S_5$, $S_6$, $S_7$) is mapped to three 2×6 mini tiles. In this case, the pilots are allocated to the second and fifth OFDM symbols and the uplink control signal is mapped to the remaining OFDM symbols.

In the type-3 subframe, the pilots are allocated to the third OFDM symbol and the uplink control signal is mapped to the remaining OFDM symbols. That is, in the type-1 subframe, the type-3 subframe may be configured by reducing the pilot of one OFDM symbol. The channel estimation performance may be degraded by reducing the number of pilots. However, when the user does not move at high speed, the channel estimation is easy, such that the uplink control signal in which the pilots are reduced may be transmitted through the type-3 subframe. For example, when the user that are moving at high speed uses a primary fast feedback channel, a secondary fast feedback channel may be used by the user that does not move at high speed, such that the type-3 subframe in which the pilots are reduced may be used as the secondary fast feedback channel. The sequence of the control signal may first be mapped to the frequency domain or the time domain and the order in which the sequence of the control signal is mapped is not limited. Further, in the type-3 subframe, the pilots may be arranged at any one OFDM symbol or may be distributed and arranged in the time domain.

Figure 13:
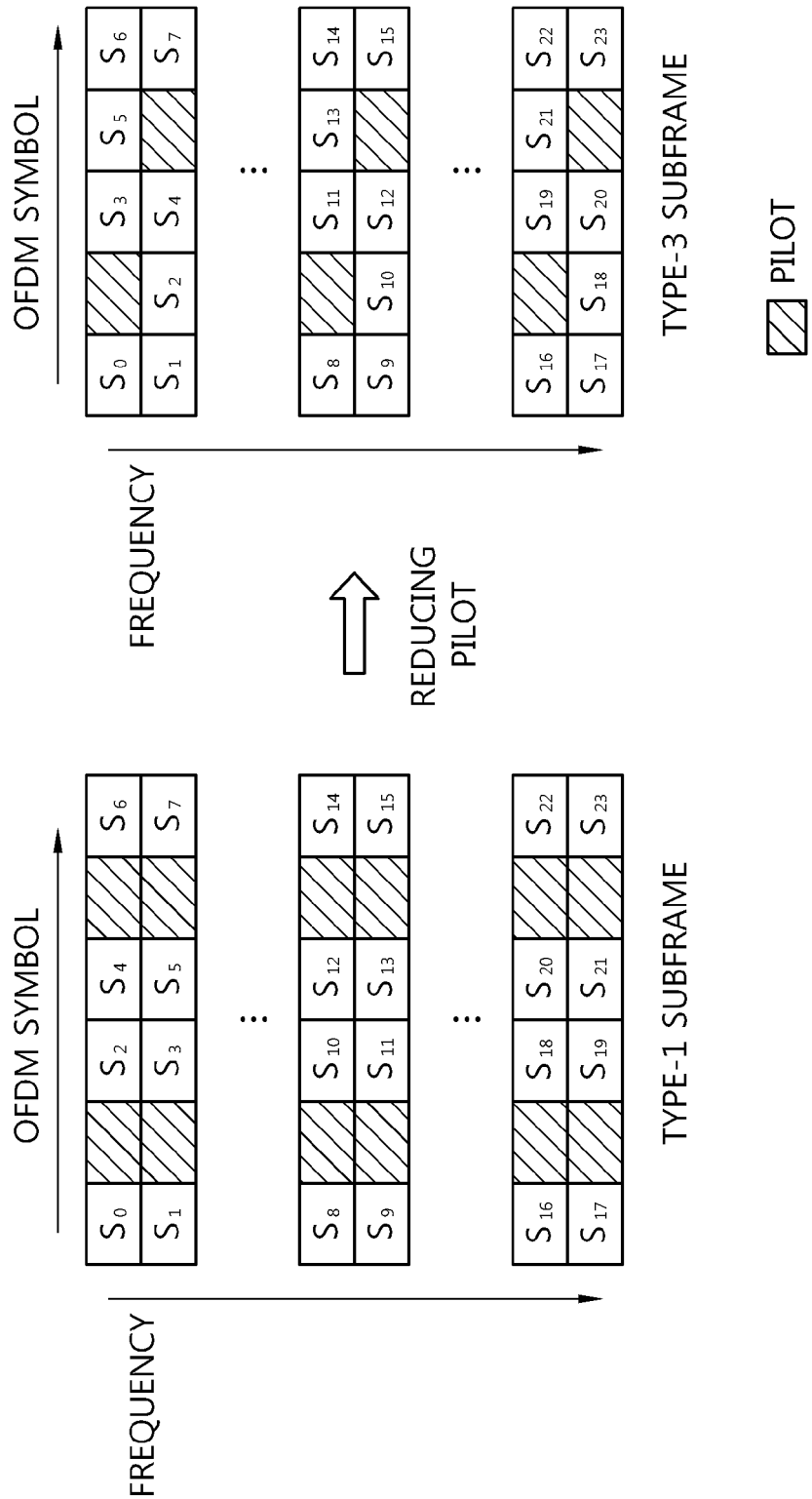
FIG. 13 is a diagram showing an uplink control channel according to another exemplary embodiment of the present invention.

FIG. 13 shows an uplink control channel according to another exemplary embodiment of the present invention. The example is the uplink control channel based on the type-3 subframe including 5 OFDM symbols.

As compared with FIG. 12, FIG. 13 shows the case in which the pilots in the type-3 subframe are distributed and arranged in the time domain is shown. The position where the pilots are arranged is not limited.

Figure 14:
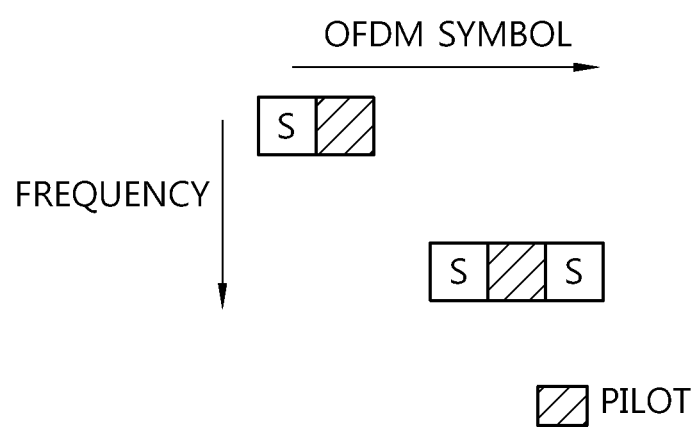
FIG. 14 is a diagram showing an uplink control channel according to another exemplary embodiment of the present invention.

FIG. 14 shows an uplink control channel according to another exemplary embodiment of the present invention. The example is the uplink control channel based on the type-3 subframe including 5 OFDM symbols.

Referring to FIG. 14, in the case of the uplink control channel using the mini tile having the small size like the uplink HARQ feedback channel, 1×2 mini tile and 1×3 mini tile may be used in 6×5 tile. The pilots may be allocated to each mini tile one by one and the sequence or the symbol of the uplink control signal is mapped to the remaining OFDM symbols. The position of the pilots is not limited. 1×2 mini tile and 1×3 mini tile may be distributed in the time domain and/or the frequency domain.

Figure 15:
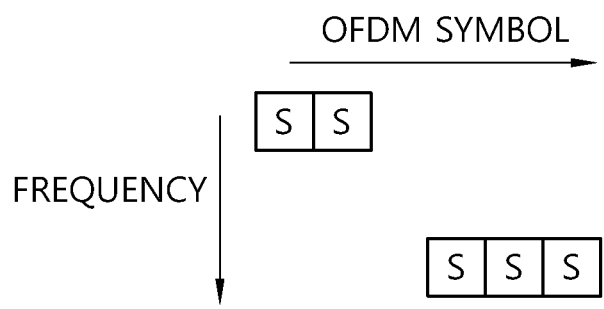
FIG. 15 is a diagram showing an uplink control channel according to another exemplary embodiment of the present invention.

FIG. 15 shows an uplink control channel according to another exemplary embodiment of the present invention. The example is the uplink control channel based on the type-3 subframe including 5 OFDM symbols.

As compared with FIG. 14, FIG. 15 shows the case in which the pilots are not allocated. In the case of FIG. 14, the control signal may be detected in the coherent manner using the pilots and in the case of FIG. 15, the control signal may be detected in the non-coherent manner.

Figure 16:
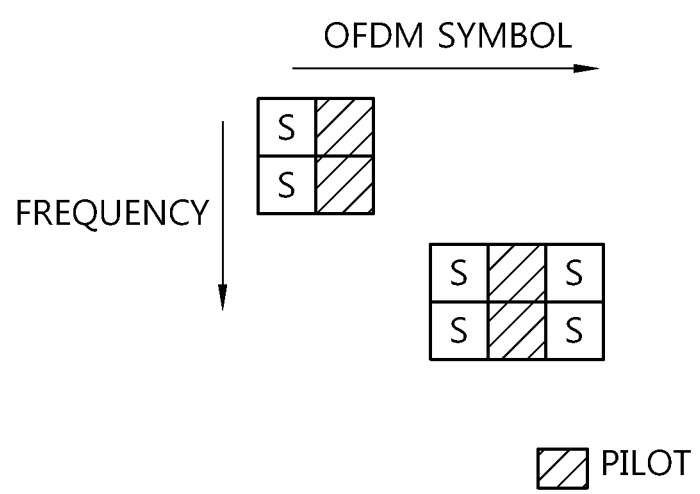
FIG. 16 is a diagram showing an uplink control channel according to another exemplary embodiment of the present invention.

FIG. 16 shows an uplink control channel according to another exemplary embodiment of the present invention. The example is the uplink control channel based on the type-3 subframe including 5 OFDM symbols.

Referring to FIG. 16, 2×2 mini tile and 2×3 mini tile in 6×5 tile may be used as the uplink control channel. The pilots may be allocated to one OFDM symbol for each mini tile and the sequence or the symbol of the uplink control signal is mapped to the remaining OFDM symbols. The position of the pilots is not limited. 2×2 mini tile and 2×3 mini tile may be distributed in the time domain and/or the frequency domain.

Figure 17:
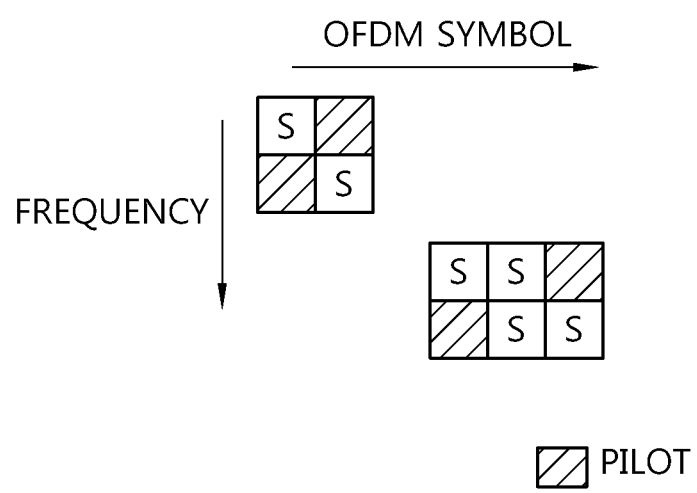
FIG. 17 is a diagram showing an uplink control channel according to another exemplary embodiment of the present invention.

FIG. 17 shows an uplink control channel according to another exemplary embodiment of the present invention.

As compared with FIG. 16, FIG. 17 shows the case in which the pilots are not mapped to one OFDM symbol in each mini tile and is distributed and mapped to the time domain. The number and position of the pilots are not limited.

Figure 18:
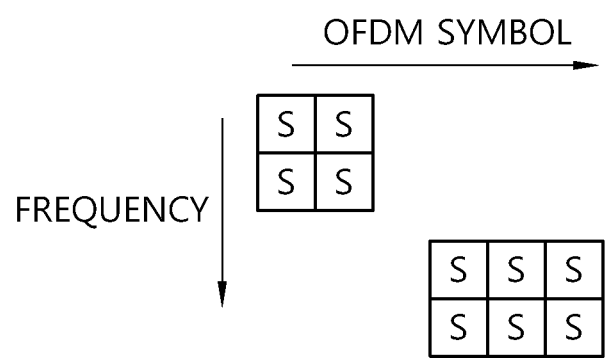
FIG. 18 is a diagram showing an uplink control channel according to another exemplary embodiment of the present invention.

FIG. 18 shows an uplink control channel according to another exemplary embodiment of the present invention.

As compared with FIGS. 16 and 17, FIG. 18 shows the case in which the pilots are not allocated.

Figure 19:
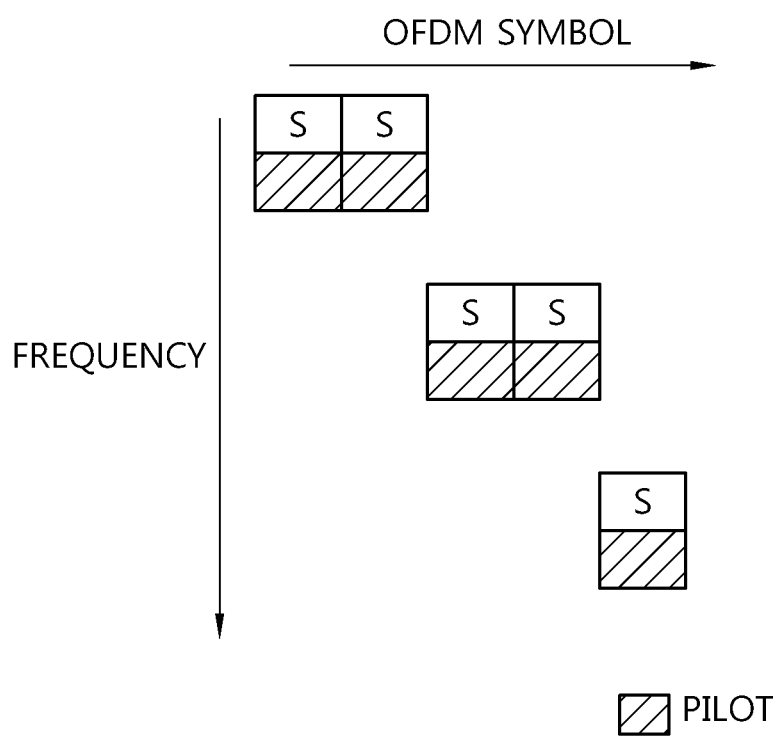
FIG. 19 is a diagram showing an uplink control channel according to another exemplary embodiment of the present invention.

FIG. 19 shows an uplink control channel according to another exemplary embodiment of the present invention. The example is the uplink control channel based on the type-3 subframe including 5 OFDM symbols.

Referring to FIG. 19, two 2×2 mini tiles and 2×1 mini tile in 6×5 tile may be used as the uplink control channel. At least one pilot may be allocated to each mini tile and the sequence or the symbol of the uplink control signal is mapped to the remaining resource elements. The position of the pilots is not limited. In this case, the pilot is mapped to one subcarrier in the frequency domain of each mini tile. 2×2 mini tile and 2×1 mini tile may be distributed in the time domain and/or the frequency domain.

Figure 20:
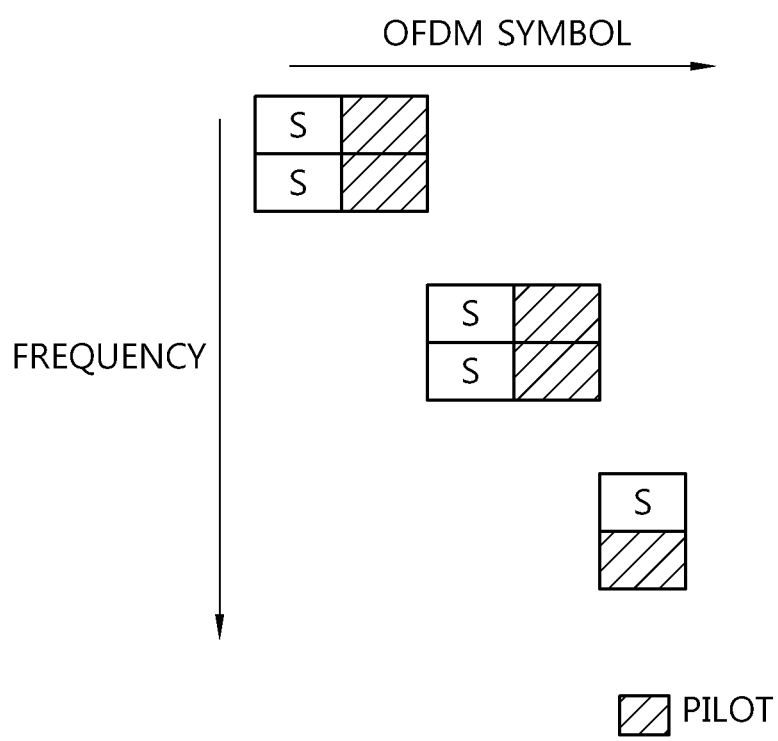
FIG. 20 is a diagram showing an uplink control channel according to another exemplary embodiment of the present invention.

FIG. 20 shows an uplink control channel according to another exemplary embodiment of the present invention.

As compared with FIG. 19, FIG. 20 shows the case in which the pilots are mapped to one OFDM symbol in the time domain of 2×2 mini tile. In the 2×1 mini tile, the pilots are mapped to one subcarrier in the frequency domain.

Figure 21:
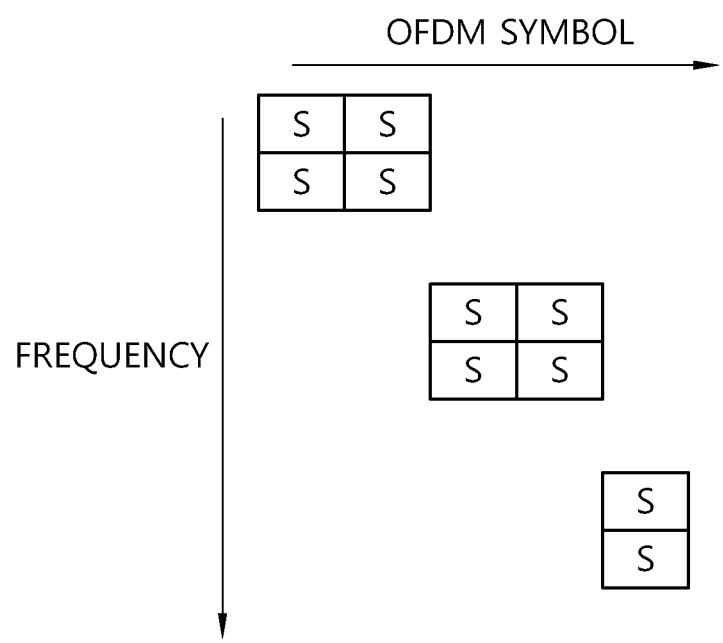
FIG. 21 is a diagram showing an uplink control channel according to another exemplary embodiment of the present invention.

FIG. 21 shows an uplink control channel according to another exemplary embodiment of the present invention.

As compared with FIGS. 19 and 20, FIG. 21 shows the case in which the pilots are not allocated.

<Uplink Control Channel Based on 3 OFDM Symbols>

When the uplink region includes 15 OFDM symbols, the uplink region may be configured of a short subframe including two type-1 subframes and 3 OFDM symbols. In this case, the short subframe is used to transmit the uplink control signal and two type-1 subframe may be used to perform the uplink data transmission or other uplink control signal transmission. That is, the uplink control signal may be mapped based 3 OFDM symbols as a basic unit.

Figure 22:
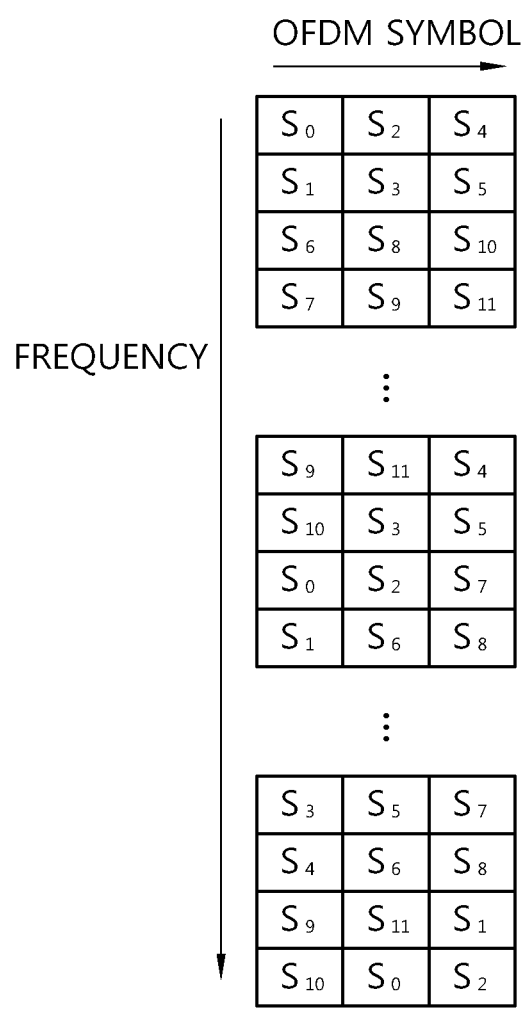
FIG. 22 is a diagram showing an uplink control channel according to another exemplary embodiment of the present invention.

FIG. 22 shows an uplink control channel according to another exemplary embodiment of the present invention. The example is the uplink control channel based on the short subframe including 3 OFDM symbols.

Referring to FIG. 22, the uplink control channel using three 2×6 mini tiles in the type-1 subframe may be configured of the uplink control channel using three 4×3 mini tiles in the short subframe. That is, the mini tile of the uplink control channel of the short subframe may be configured while reducing a portion exceeding 3 OFDM symbols in the type-1 subframe and extending to the frequency domain by the reduced resource element. In the type-1 subframe, the sequence or symbol of the uplink control signal mapped to the portion exceeding 3 OFDM symbols may be mapped to the portion extending to the frequency domain in the short subframe. The order in which the sequence of the uplink control signal is mapped to the uplink control channel of the short subframe is not limited.

Figure 23:
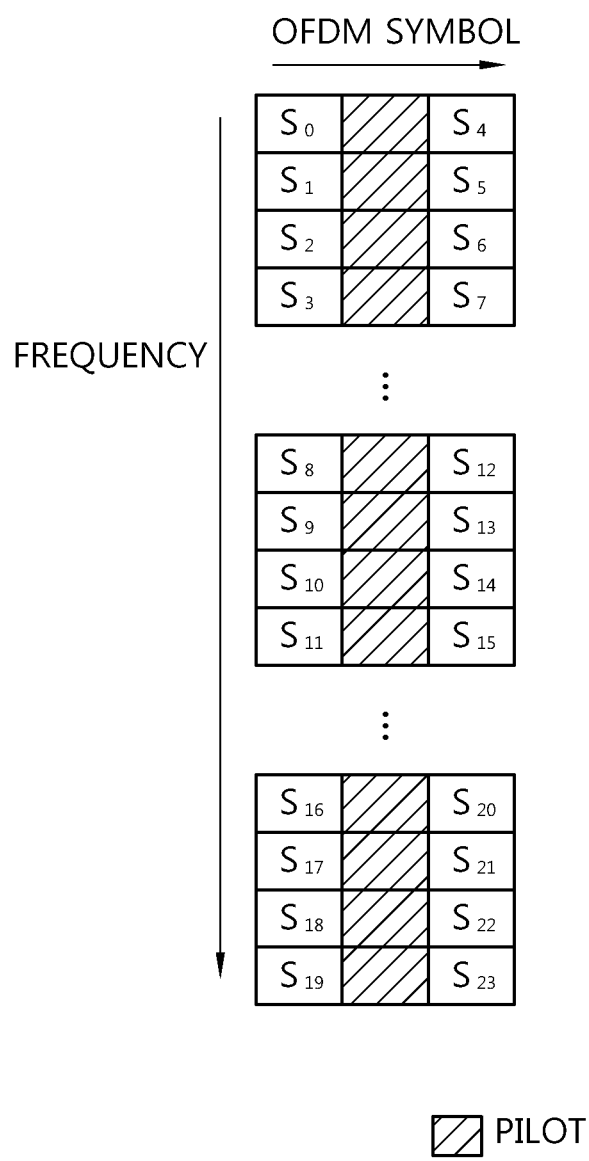
FIG. 23 is a diagram showing an uplink control channel according to another exemplary embodiment of the present invention.

FIG. 23 shows an uplink control channel according to another exemplary embodiment of the present invention.

As compared with FIG. 22, FIG. 23 shows the case in which the pilots are allocated to one OFDM symbol. The number and position of the pilots are not limited. For example, the pilots may be allocated to corner portions of each mini tile.

Figure 24:
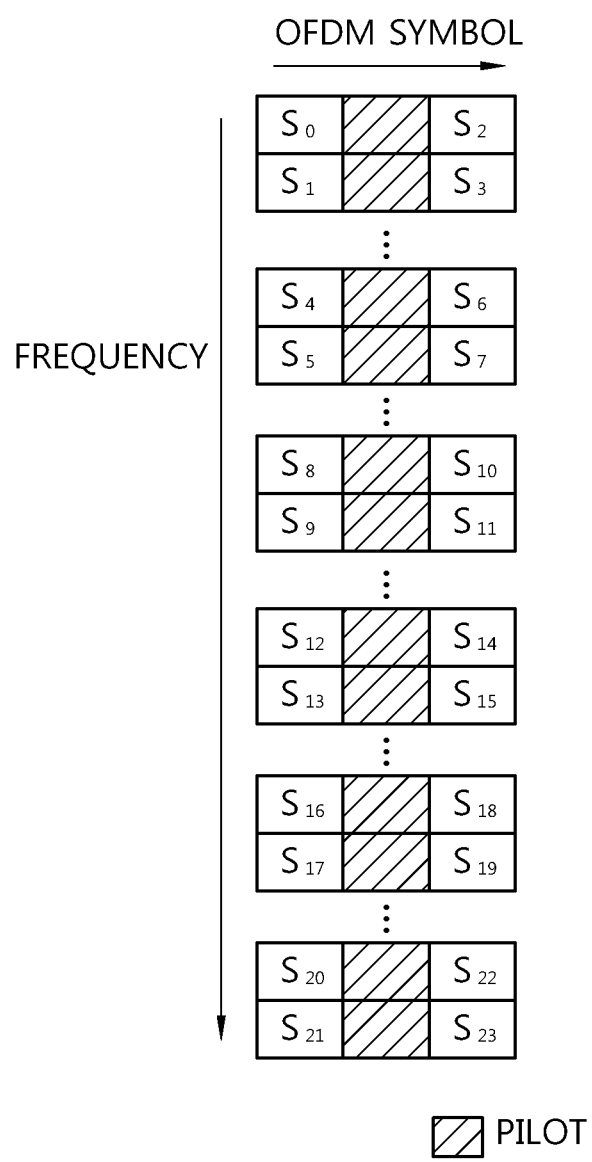
FIG. 24 is a diagram showing an uplink control channel according to another exemplary embodiment of the present invention.

FIG. 24 shows an uplink control channel according to another exemplary embodiment of the present invention. The example is the uplink control channel based on the short subframe including 3 OFDM symbols.

Referring to FIG. 24, the uplink control channel using three 2×6 mini tiles in the type-1 subframe may be configured of the uplink control channel using six 2×3 mini tiles in the short subframe. That is, the portion exceeding 3 OFDM symbols in the 2×6 mini tile of the type-1 subframe is added as the 2×3 mini tile within the time domain of the short subframe, thereby configuring the uplink control channel at the short subframe.

The pilots may be allocated to each mini tile. In this case, the case in which the pilots are allocated to the second OFDM symbol is shown, but the position of the pilots are not limited. When using the non-coherent detection manner, the pilots may not be allocated to the uplink control channel. The order in which the sequence of the uplink control signal is mapped to the uplink control channel of the short subframe is not limited.

Meanwhile, when the plurality of short subframes are consecutive in the time domain, the uplink control channel may be configured in the type-1 subframe using two short subframes including 3 OFDM symbols.

<Uplink Control Channel Based on 7 OFDM Symbols or 9 OFDM Symbols>

Figure 25:
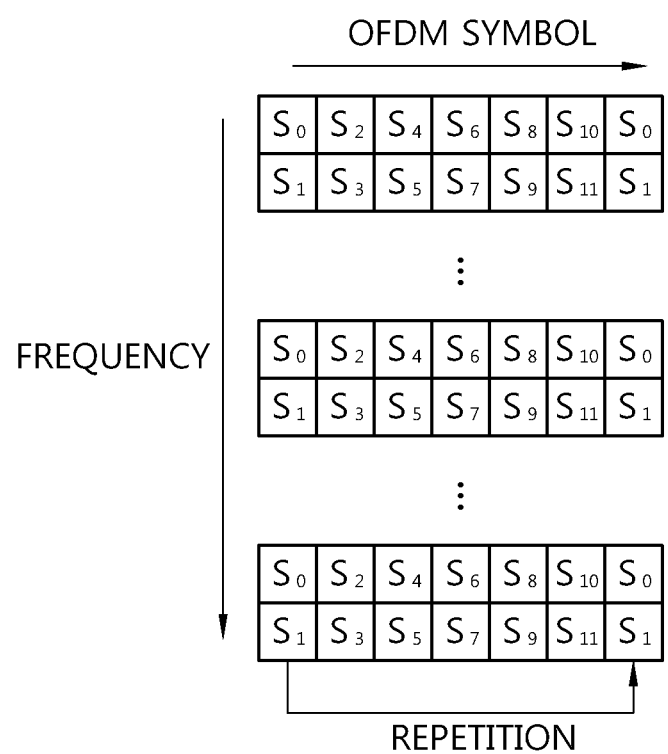
FIG. 25 is a diagram showing an uplink control channel according to another exemplary embodiment of the present invention.

FIG. 25 shows an uplink control channel according to another exemplary embodiment of the present invention. The example is the uplink control channel based on the type-2 subframe including 7 OFDM symbols.

Referring to FIG. 25, the tile of the type-2 subframe including 7 OFDM symbols has a 6×7 structure. In this case, the uplink control channel in the type-2 subframe uses the uplink control channel structure of the type-1 subframe as it is and the sequence of the uplink control signal may be repeatedly mapped to the remaining one OFDM symbol.

For example, in the tile of the type-2 subframe, three 2×7 mini tiles may be used as the uplink control channel. The uplink control signal S ($S_0, \ldots, S_{11}$) is mapped to 6 OFDM symbols and some of the sequence of the uplink control signals are repeatedly mapped to the remaining one OFDM symbol. Herein, the case in which the first two symbols ($S_0$ and $S_1$) of the sequence of the uplink control signal are repeated is shown without being not limited and therefore, any portion of the sequence of the uplink control signal may be repeatedly mapped to the remaining OFDM symbols. Even in the type-2 subframe, the uplink control channel structure may be used in the type-1 subframe as it is.

Figure 26:
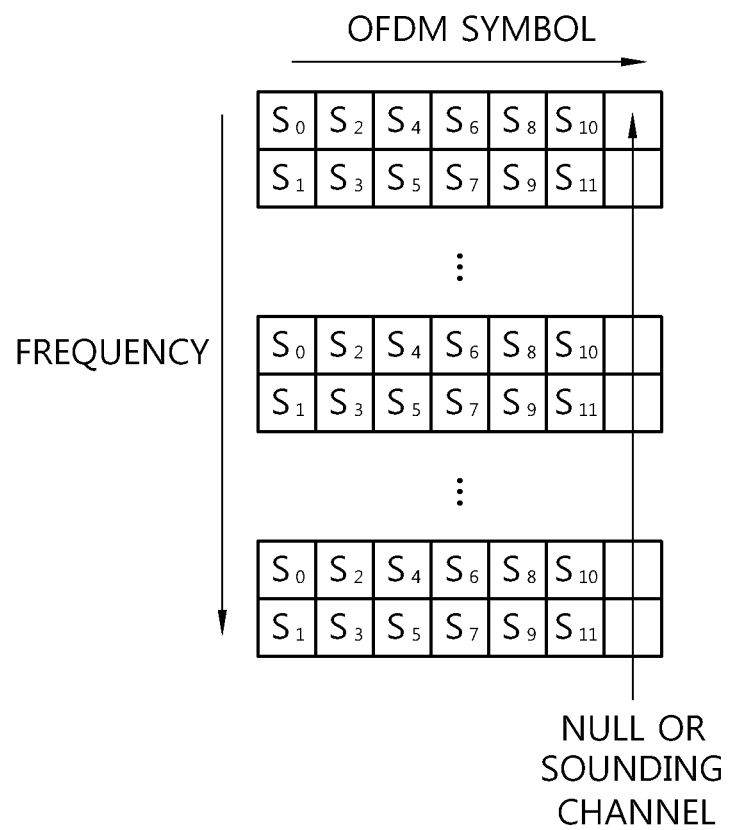
FIG. 26 is a diagram showing an uplink control channel according to another exemplary embodiment of the present invention.

FIG. 26 shows an uplink control channel according to another exemplary embodiment of the present invention. The example is the uplink control channel based on the type-2 subframe including 7 OFDM symbols.

Referring to FIG. 26, in the type-2 subframe including 7 OFDM symbol, the uplink control channel uses the uplink control channel of the type-1 subframe as it is and the remaining OFDM symbols may be configured by mapping null thereto. The OFDM symbol to which the null is mapped may be used as a gap between the uplink region and the downlink region in the frame structure of the TDD type. Alternatively, the OFDM symbol to which the null is mapped may be used as a sounding channel. The sounding channel is a channel on which the signal to measure the channel state of the uplink channel is carried.

As described above, the uplink control channel structure of the type-1 subframe is used in the type-2 subframe as it is and the remaining OFDM symbols are used as the null or the sounding channel, such that there is no need to design the separate uplink control channel for the type-2 subframe and the complexity of the uplink control channel is not increased.

Figure 27:
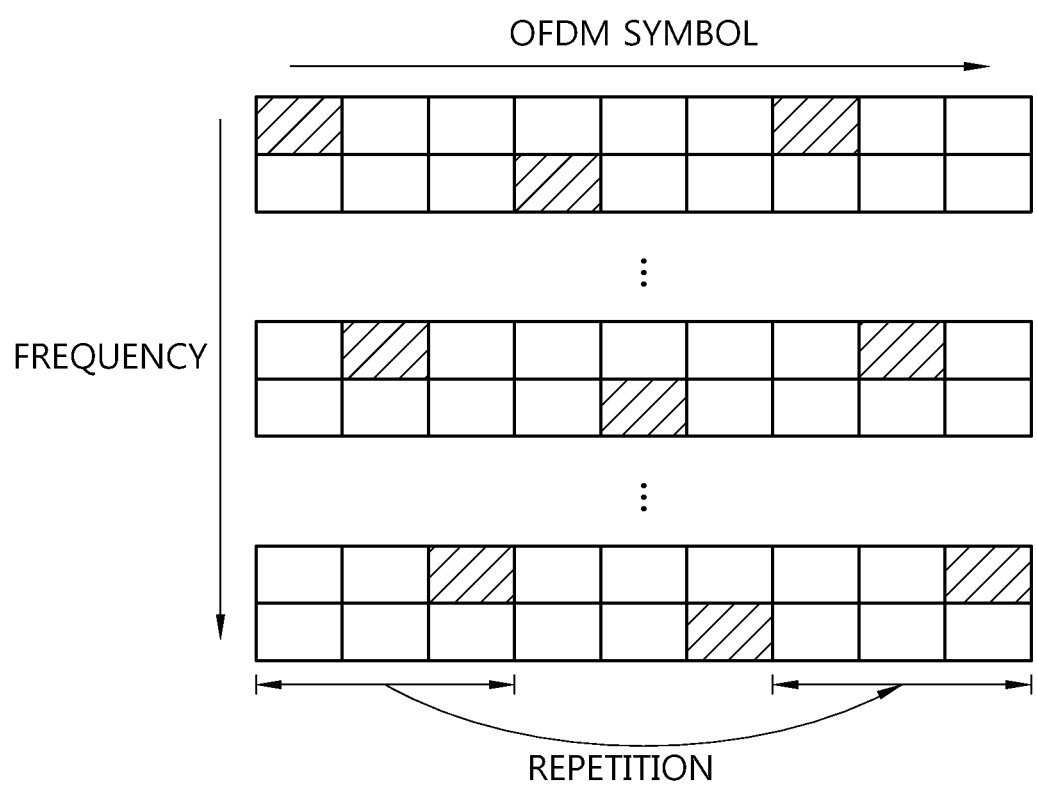
FIG. 27 is a diagram showing an uplink control channel according to another exemplary embodiment of the present invention.

FIG. 27 shows an uplink control channel according to another exemplary embodiment of the present invention. The example is the uplink control channel based on the type-2 subframe including 9 OFDM symbols.

Referring to FIG. 27, the type-2 subframe including 9 OFDM symbols may be used. In the case in which the bandwidth is 8.75 MHz, 9 OFDM symbols may be included in the type-2 subframe. The tile of the type-2 subframe including 9 OFDM symbols has a 6×9 structure. In this case, in the type-2 subframe, the uplink control channel uses the uplink control channel structure of the type-1 subframe as it is and the first three OFDM symbols or the final three OFDM symbols of the type-1 subframe may be repeated to the remaining 3 OFDM symbols. The repeated OFDM symbol may be arbitrarily selected. That is, some of the sequence of the uplink control signal are repeatedly mapped to the remaining 3 OFDM symbols. In the type-2 subframe, the sequence portion of the uplink control signal repeated to the remaining OFDM symbols is not limited and any portion of the sequence of the uplink control signal may be repeatedly mapped to the remaining OFDM symbols. In the type-2 subframe including 9 OFDM symbols, the pilots included in the used type-1 subframe may be repeatedly mapped even to the remaining 3 OFDM symbols. The user equipment uses the pilots included in the type-2 subframe to detect the control signal in the coherent manner.

Meanwhile, the null may be mapped to the remaining 3 OFDM symbols without repeating the sequence of the uplink control signal and the pilots. The remaining OFDM symbols to which the null is mapped is used as the gap between the uplink region and the downlink region or as the sounding channel.

Figure 28:
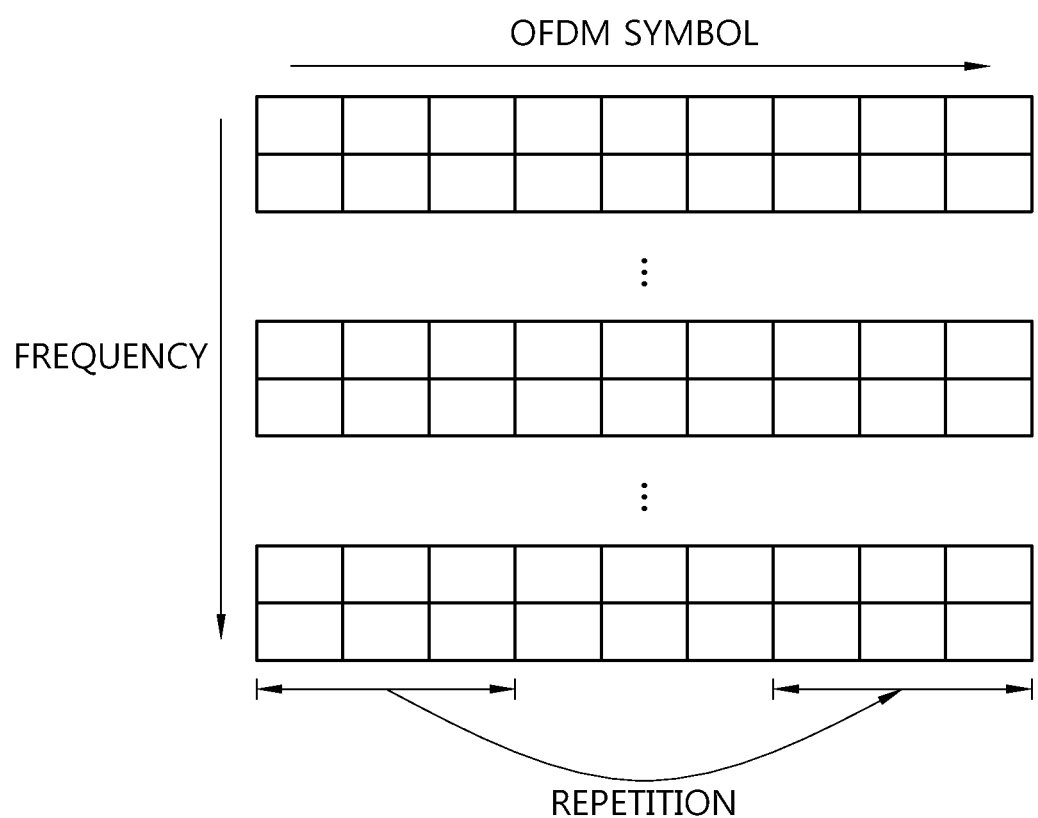
FIG. 28 is a diagram showing an uplink control channel according to another exemplary embodiment of the present invention.

FIG. 28 shows an uplink control channel according to another exemplary embodiment of the present invention.

As compared with FIG. 27, FIG. 28 shows the case in which the pilots are not allocated. The user equipment may detect the control signal in the non-coherent manner. In this case, in the type-2 subframe including 9 OFDM symbols, the uplink control channel uses the uplink control channel structure of the type-1 subframe as it is and any three OFDM symbols of the type-1 subframe may be repeated to the remaining 3 OFDM symbols.

Figure 29:
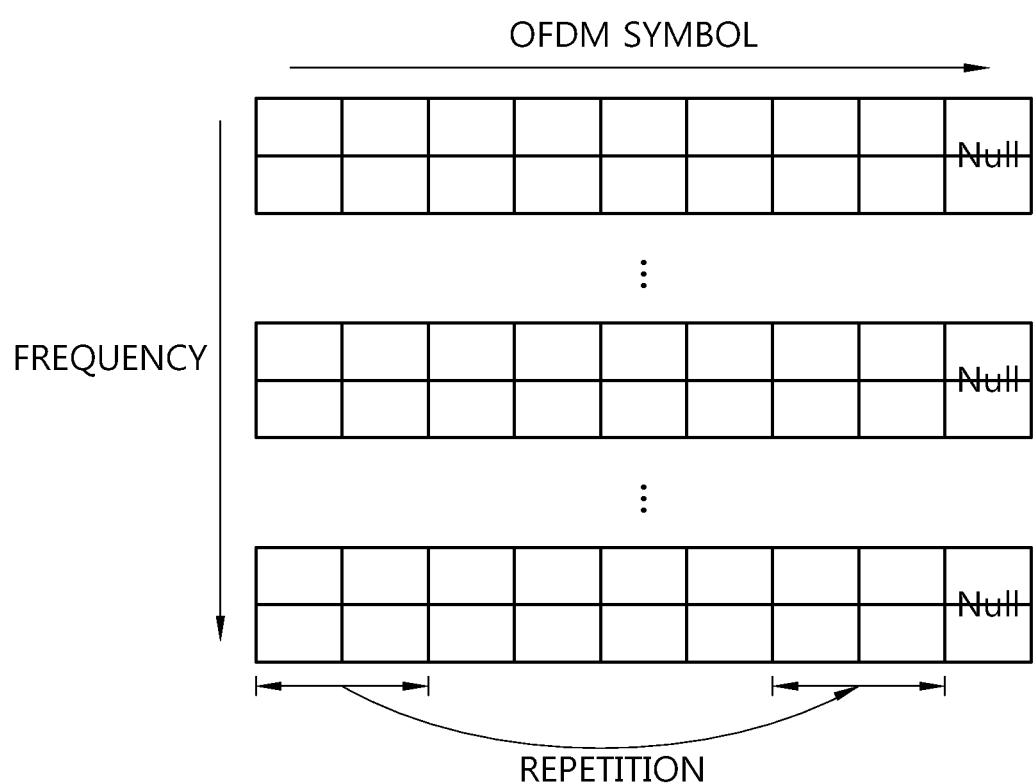
FIG. 29 is a diagram showing an uplink control channel according to another exemplary embodiment of the present invention.
Figure 30:
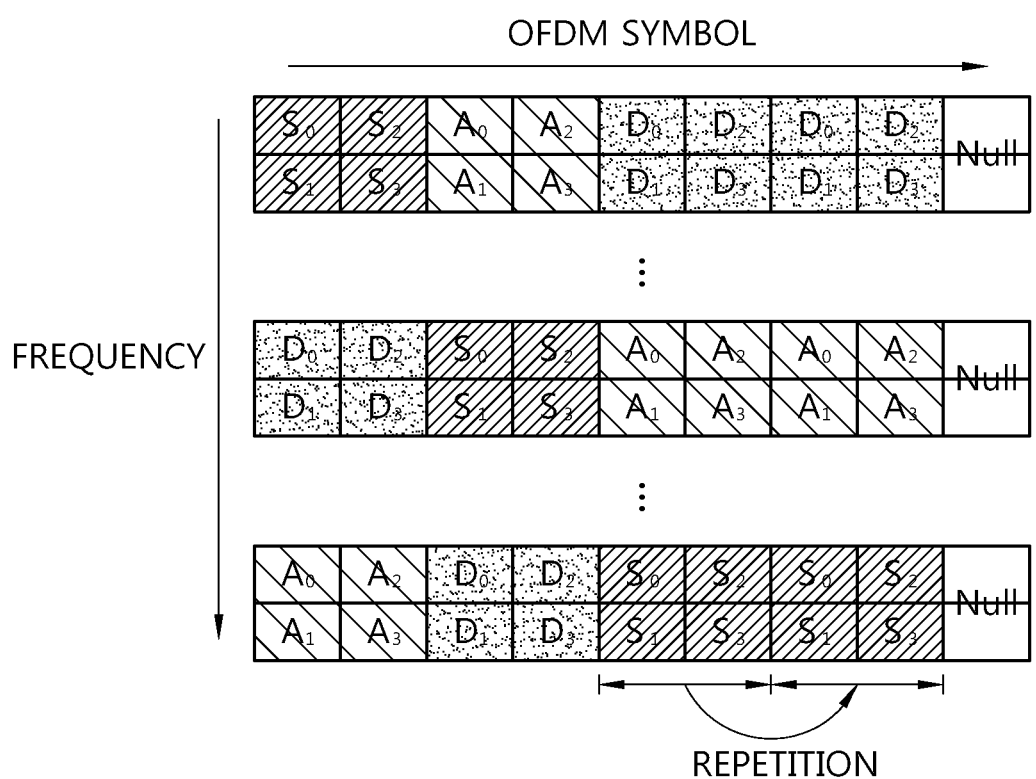
FIG. 30 is a diagram showing an uplink control channel according to another exemplary embodiment of the present invention.

FIGS. 29 and 30 show an uplink control channel according to another exemplary embodiment of the present invention. The example is the uplink control channel based on the type-2 subframe including 9 OFDM symbols.

Referring to FIGS. 29 and 30, the uplink control channel in the type-2 subframe including 9 OFDM symbols uses the uplink control channel structure of the type-1 subframe as it is and in the remaining 3 OFDM symbols, the null is mapped to one OFDM symbol and any two OFDM symbols of the type-1 subframe may be repeated to the other two OFDM symbols.

For example, when using the 2×2 mini tile like the HARQ feedback channel, the first 2 OFDM symbols or the middle 2 OFDM symbols or the final 2 OFDM symbols among 6 OFDM symbols of the type-1 subframe are repeated to the remaining OFDM symbols and the null may be mapped to one OFDM symbol. The HARQ feedback signals S ($S_0$, $S_1$, $S_2$, $S_3$), A ($A_0$, $A_1$, $A_2$, $A_3$), and D ($D_0$, $D_1$, $D_2$, $D_3$) are distributed and mapped to three 2×9 HARQ feedback signals so as not to overlap each other and in the 2×9 mini tile, the HARQ feedback signal having a 2×2 structure may be repeatedly mapped to the remaining OFDM symbols.

As described above, the uplink control channel in the type-2 subframe including several N OFDM symbols exceeding the type-1 subframe uses the uplink control channel structure of the type-1 subframe and the null is mapped to N−6 OFDM symbols or some of the sequence of the uplink control signal may be repeatedly mapped thereto (an integer, N>6).

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting a control signal in a radio communication system, the method comprising:
generating a control signal in accordance with a type of subframe for transmitting the control signal, wherein the type of subframe is one of a first type of subframe including a basic number of OFDM symbols, a second type of subframe including a larger number of OFDM symbols than the first type of subframe, and a third type of subframe including a smaller number of OFDM symbols than the first type of subframe; and
transmitting the control signal through a control channel in a subframe determined in accordance with the type of the subframe.

2. The method of claim 1, wherein when the type of subframe is the second type of subframe, the first type of subframe is applied to the subframe and a null or a part of a sequence of the control signal is mapped to the remaining OFDM symbols to generate the control signal.

3. The method of claim 2, wherein a sounding signal for measuring a channel state is mapped to the OFDM symbol to which the null is mapped.

4. The method of claim 1, wherein when the type of subframe is the third type of subframe, a part of a sequence of the control signal is punctured to be mapped to the subframe.

5. The method of claim 1, wherein the third type of subframe includes a smaller number of pilots corresponding to a difference in the number of OFDM symbols than the number of pilots included in the first type of subframe.

6. The method of claim 1, further comprising receiving information on the type of subframe.

7. A method for transmitting a control signal in a radio communication system, the method comprising:
mapping a control signal to a control channel, the control channel including a plurality of mini tiles, each mini tile including at least one OFDM symbol in time domain and at least one subcarrier in frequency domain; and
transmitting the control signal, wherein the plurality of mini tiles are distributed in the time domain or the frequency domain within a subframe, the subframe including at least one larger number of OFDM symbol or at least one smaller number of OFDM symbol than a reference subframe, and wherein a null or a sequence of the control signal is repeatedly mapped to the subframe having larger number of OFDM symbol, and the sequence of the control signal or a pilot is punctured and mapped to the subframe having smaller number of OFDM symbol.

8. The method of claim 7, wherein the number of OFDM symbols included in the subframe corresponds to the number of OFDM symbols included in a logical distributed resource unit.

* * * * *